US007689409B2

(12) United States Patent
Heinecke

(10) Patent No.: US 7,689,409 B2
(45) Date of Patent: Mar. 30, 2010

(54) TEXT LANGUAGE IDENTIFICATION

(75) Inventor: Johannes Heinecke, Lannion (FR)

(73) Assignee: France Telecom, Paris (FR)

( * ) Notice: Subject to any disclaimer, the term of this patent is extended or adjusted under 35 U.S.C. 154(b) by 1494 days.

(21) Appl. No.: 10/732,809

(22) Filed: Dec. 11, 2003

(65) Prior Publication Data

US 2004/0138869 A1    Jul. 15, 2004

(30) Foreign Application Priority Data

Dec. 17, 2002 (FR) .................................. 02 16250

(51) Int. Cl.
*G06F 17/20* (2006.01)
*G06F 17/28* (2006.01)
*G06F 17/27* (2006.01)
*G06K 9/72* (2006.01)

(52) U.S. Cl. .................. 704/9; 704/1; 704/2; 704/3; 704/8; 382/229; 382/230

(58) Field of Classification Search .............. 704/1, 704/8, 9, 2, 3; 382/229, 230
See application file for complete search history.

(56) References Cited

U.S. PATENT DOCUMENTS

| 4,058,795 | A | * | 11/1977 | Balm | 382/230 |
| 4,654,875 | A | * | 3/1987 | Srihari et al. | 382/229 |
| 4,754,489 | A | * | 6/1988 | Bokser | 382/230 |
| 4,829,580 | A | * | 5/1989 | Church | 704/260 |
| 5,062,143 | A | | 10/1991 | Schmitt | |
| 5,377,280 | A | * | 12/1994 | Nakayama | 382/229 |
| 5,392,419 | A | * | 2/1995 | Walton | 358/1.13 |
| 5,548,507 | A | * | 8/1996 | Martino et al. | 704/1 |
| 5,805,730 | A | * | 9/1998 | Yaeger et al. | 382/228 |
| 5,960,113 | A | * | 9/1999 | Even et al. | 382/229 |
| 5,982,929 | A | * | 11/1999 | Ilan et al. | 382/200 |
| 5,991,714 | A | * | 11/1999 | Shaner | 704/9 |
| 6,002,998 | A | * | 12/1999 | Martino et al. | 704/9 |
| 6,009,382 | A | * | 12/1999 | Martino et al. | 704/1 |
| 6,023,670 | A | * | 2/2000 | Martino et al. | 704/8 |
| 6,047,251 | A | * | 4/2000 | Pon et al. | 704/1 |
| 6,157,905 | A | * | 12/2000 | Powell | 704/2 |
| 6,167,369 | A | * | 12/2000 | Schulze | 704/9 |
| 6,272,456 | B1 | * | 8/2001 | de Campos | 704/8 |
| 6,292,772 | B1 | * | 9/2001 | Kantrowitz | 704/9 |
| 6,415,250 | B1 | | 7/2002 | van den Akker | |
| 6,477,494 | B2 | * | 11/2002 | Hyde-Thomson et al. | 704/260 |
| 6,487,533 | B2 | * | 11/2002 | Hyde-Thomson et al. | 704/260 |

(Continued)

*Primary Examiner*—David R Hudspeth
*Assistant Examiner*—Paras Shah
(74) *Attorney, Agent, or Firm*—Lowe Hauptman Ham & Berner LLP

(57) ABSTRACT

After prestoring first character strings that occur frequently in words of languages and second character strings that are a typical therein, a device for automatically identifying the language of a text from a plurality of languages extracts words from the text and constructs all of the character strings contained in each extracted word. Each string in an extracted word is compared to the first and second strings of a particular language. If the word contains a first string, a score of the language is increased by a coefficient depending in particular on the position of the first string in the word. If the word contains a second string, the score is decreased by a coefficient associated with the second string. The highest of the scores corresponding to the predetermined languages identifies the language of the text.

9 Claims, 2 Drawing Sheets

U.S. PATENT DOCUMENTS

| | | |
|---|---|---|
| 6,539,118 B1 * | 3/2003 | Murray et al. ............... 382/229 |
| 6,704,698 B1 * | 3/2004 | Paulsen et al. ................. 704/1 |
| 6,711,542 B2 * | 3/2004 | Theimer ..................... 704/257 |
| 7,035,801 B2 * | 4/2006 | Jimenez-Feltstrom ....... 704/255 |
| 7,039,637 B2 * | 5/2006 | Murray et al. ................. 707/6 |
| 7,139,697 B2 * | 11/2006 | Hakkinen et al. ............... 704/9 |
| 7,191,116 B2 * | 3/2007 | Alpha .......................... 704/8 |
| 7,251,665 B1 * | 7/2007 | Dunning et al. .......... 707/104.1 |
| 7,359,851 B2 * | 4/2008 | Tong et al. ..................... 704/8 |
| 2004/0205675 A1 * | 10/2004 | Veerappan et al. .......... 715/536 |

* cited by examiner

TEXT LANGUAGE IDENTIFICATION

RELATED APPLICATION

The present application is based on, and claims priority from, FR Application Number 0216250, filed Dec. 17, 2002, the disclosure of which is hereby incorporated by reference herein in its entirety.

BACKGROUND OF THE INVENTION

1. Field of the Invention

The present invention relates to identifying the language of a text which can be short and made up of only a few words or even a single word.

2. Description of the Prior Art

The invention applies in particular to the automatic processing of natural language to recognize the language of a written text, for example before the text is translated into other languages or synthesized into a spoken message. Tools for automatically processing natural language, such as syntactical analyzers and/or semantic analyzers, use data sets characterizing only one language at a time, such as a lexicon of basic lexical forms constituting dictionary or lexicon entries, morphological rules and grammatical rules, for only one language at a time. Even if the tool is capable of processing any language, the data is often prepared in order to analyze one language at a time.

Identification of the language of a text is therefore essential before analyzing the text linguistically.

To cite another example, identification of the language is even more necessary if a text is written in more than one language, for example to translate a multilingual text into a single language.

U.S. Pat. No. 5,062,143 proposes a statistical approach to analyzing the language used in a text using trigrams, i.e. strings of three consecutive characters. Initially, for each language, trigrams that appear the most frequently in a text of that language of a reasonable size, for example approximately 500 characters, are detected to constitute a key set of trigrams. Trigrams whose frequency of occurrence is at least equal to a prescribed frequency are used as the key set for that language. For a 26 letter alphabet and trigrams made up of characters including at least one space position, for example, the key set comprises approximately 80 trigrams that occur at a frequency representative of a fairly high probability.

The text of which the language to be identified is then analyzed to break it into trigrams in order to recognize therein and count the trigrams of the key set for a given language. The trigrams of the key sets for the other languages are also detected and counted. The language for which the percentage of matches of trigrams with the respective key set is the greatest and exceeds a prescribed value is deemed to be the language in which the text is written.

The foregoing identification of a language by means of a statistical approach is considerably dependent on the length of the text whose language is to be identified. If the text, such as a sentence, is relatively long, the trigram-based approach of U.S. Pat. No. 5,062,143 yields a reliable result even if the text contains words of another language. On the other hand, the identification of a language in a short sentence by means of only trigrams is significantly less precise, especially as the number of languages to be identified is large. For example, the language of the English sentence "I want to go to Birmingham" may be identified as Polish, because of the trigrams "t-o-space", and "space-t-o", which are more frequent in Polish than in English.

Instead of identifying the language of an entire text document, the method of U.S. Pat. No. 6,292,772 B1 accurately identifies the language of individual words. The identifying method of this patent utilizes character n-grams of any length, e.g. unigrams, bigrams, trigrams, and so on, and not just trigrams. Each word is broken down into one or more consecutive n-grams to determine a first n-gram at the start of the word, one or more subsequent n-grams and an end n-gram that do not overlap and characterize the word to be analyzed. All these n-grams are compared to prestored n-grams of a language defined statistically in texts from which the language is learned.

This method therefore determines the language to which an isolated word belongs and is repeated for each of the words of a text to identify the language of that text.

If a word, i.e. an n-gram model, is contained in plural languages, respective weights are assigned to those languages to distinguish them. For example, if the word is "de", the statistical approach without weighting indicates exactly the same probability for French, Dutch and Spanish, these three languages all including the word "de". Weighting makes it possible to designate one of these three languages even though it is not certain that in the context of a sentence the word really belongs to that language.

U.S. Pat. No. 6,415,250 relates to an automatic language identification system based on a probabilistic analysis of predetermined portions of words extracted from an input text whose language is identified. A word portion is a prefix or a word ending having a predetermined number of characters, generally a suffix at the end of a word. A corpus analyzer associates with each word portion of a predetermined corpus in a language a normalized frequency representative of the number of times that the word portion was found in the corpus and a relative likelihood or probability derived from the frequency relative to the size of the corpus. In particular, if the word portion rarely appears in the language, the probability is close to zero. A language identification engine in the analyzer sums for each language the relative probabilities for the extracted word portions recognized in the corpus of the language and retains only the greatest sum of the accumulated relative probabilities to identify the language of the input text.

The language identification system of the previously cited U.S. patent is inaccurate since it is limited to a single category of first character strings, such as suffixes (or prefixes), in a word and therefore does not analyze each word to extract therefrom all possible character strings, regardless of their positions in the word and their lengths. The analyzer analyzes only one character string per extracted word relative to the corpus of a language.

OBJECTS OF THE INVENTION

The main object of this invention is to increase the accuracy of the identification of the language of a relatively short text from among a plurality of languages in a much more reliable and efficient manner than the prior art approaches, and independently of the analysis of a learning text in each of the languages to be identified.

The invention is not limited to trigrams or to word portions having a particular location in a word, such as a suffix, but utilizes typical and non-systematic n-grams that can be found anywhere in a word. The trigrams of a language, not only suffixes or prefixes, and not only entire words, are not an accurate reflection of the characteristics of a language enabling it to be distinguished from other predetermined languages.

Another object of the invention is to reduce the memory capacity of an automatic language identification device compared to the considerable memory capacity required to store all the trigrams and more generally the n-grams of each language for the prior art statistical approaches.

SUMMARY OF THE INVENTION

Accordingly, the invention provides an identification device for automatically identifying the language of a digital text and having stored digital character strings for each of a plurality of predetermined languages. The device comprises means for prestoring character strings found in words of predetermined languages, means for analyzing words extracted from the digital text, means for comparing character strings contained in extracted words to prestored character strings in order to determine scores associated with the predetermined languages, and means for comparing the scores for the text associated with the predetermined languages in order to determine the highest of the scores, which identifies the language of the text.

The identification device is characterized in that:

the storage means comprises in a separate way means for prestoring first character strings that occur frequently anywhere respectively in words of predetermined languages and characterize them and means for prestoring second character strings that are a typical anywhere respectively in words of predetermined languages, the analysis means constructes for each extracted word all character strings contained in the extracted word and having lengths lying between one character and the number of characters in the extracted word, and the comparison means compare each of all character strings contained in the extracted word individually to the first and second character strings of a particular language so that whenever a first character string is found in the extracted word a score associated with the particular language is increased by a first coefficient depending on the position of the first character string found in the extracted word and whenever a second character string is found in the extracted word the score is decreased by a respective second coefficient that is associated with the second found character string and that increases as the probability of the second found character string in the predetermined language decreases.

All the character strings contained in the extracted word have a length from one character to the number of characters in the extracted word. Typically, a first character string in an extracted word consists of one of the following character strings: a prefix, a pseudo-prefix, a suffix, a pseudo-suffix, an infix, a pseudo-infix.

The first coefficient of a first character string in the extracted word can depend on the frequency of the character string in the predetermined language and/or on the length of the character string.

The language identification is even more accurate when the device comprises comparator means for comparing each word extracted from the text with frequent words in the determined language and initially listed in storage means so that whenever a frequent word is found in the text the score for the determined language is increased only by a coefficient depending on the frequency of the extracted word in the particular language and/or the length of the frequent word.

BRIEF DESCRIPTION OF THE DRAWINGS

The foregoing and other objects, features and advantages of the invention will be apparent from the following detailed description of several embodiments of the present invention with reference to the corresponding accompanying drawings in which.

DETAILED DESCRIPTION OF DRAWINGS

Figure 1:
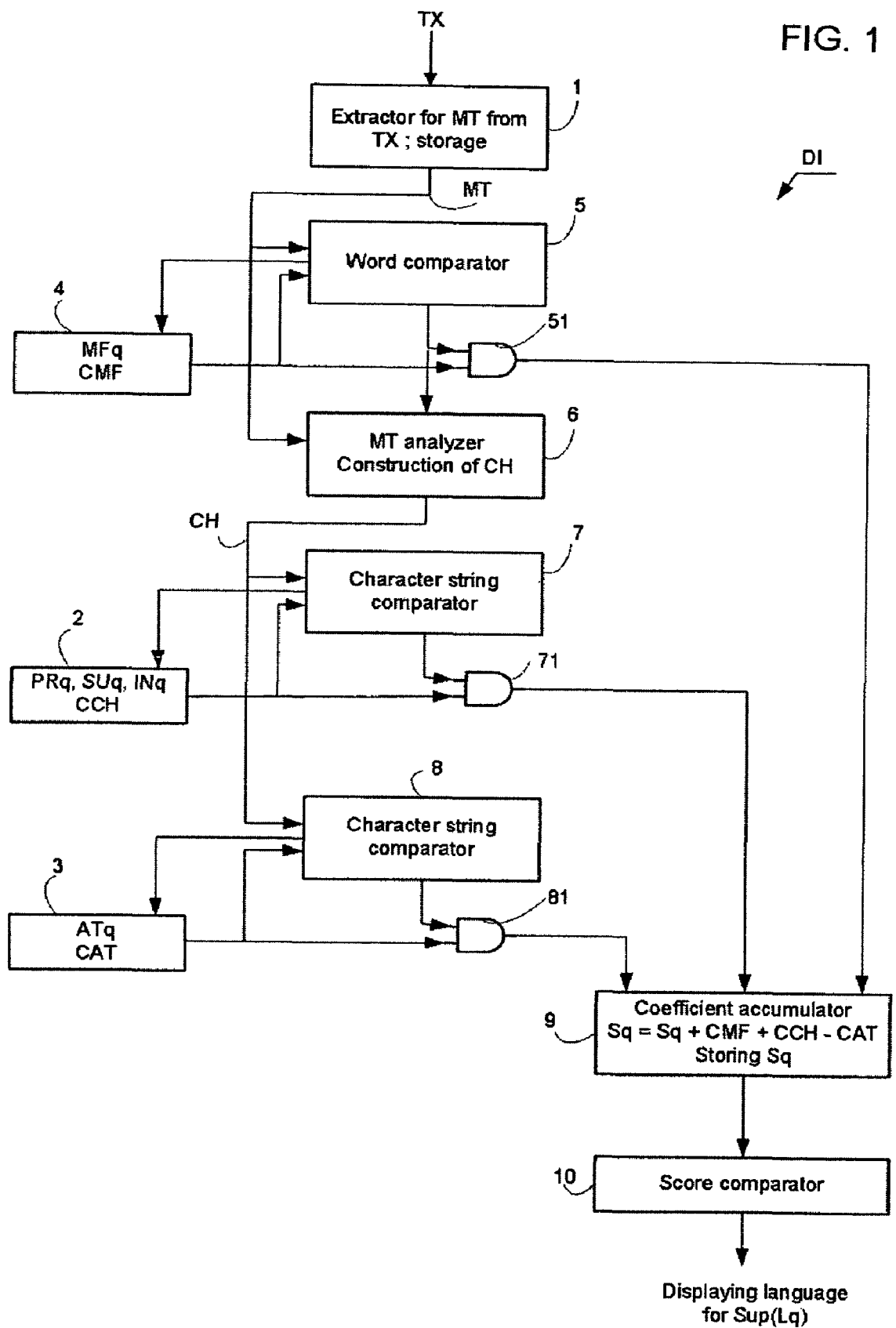
FIG. 1 is a block schematic of an automatic language identification device according to the invention.

Automatic language identification in accordance with the invention is implemented in the form of a specific application implemented in a personal computer (PC), in a user terminal that can be connected to a telephone or mobile radio telephone network and possibly to the Internet, or in a server that users can interrogate from their terminals. The personal computer, terminal or server constitutes a language identification device DI according to the invention whose main software components relating to automatic language identification in accordance with the invention are shown in FIG. 1.

A text which is initially entered into or transmitted to the language identification device DI is digitized to yield a digital text TX that is formatted in accordance with the specification of the HyperText Markup Language (HTML), for example. Specific header and end files are added to the text file TX to be processed so that the text file is in the HTML format. The text TX to be processed is divided into words MT by an extractor 1 that detects the spaces between the words in the text TX. The separate words in the text TX are stored in the device DI.

The device DI essentially comprises three types of database 2, 3 and 4 for respectively storing relatively frequent first character strings in three directories PRq, SUq and INq, a directory ATq of a typical or even unlikely character strings, and a directory MFq of frequent words relating to a particular language Lq. The databases 2, 3 and 4 in practice each include 3Q, Q, Q directories respectively relating to a plurality of languages L1 to LQ, where $1<q<Q$, and where Q is an integer that can be at least equal to 2, typically of the order of approximately 10 to 30 or more. Alternatively, the databases 2, 3 and 4 are grouped together in a database management server (DBMS).

The first three directories PRq, SUq and INq relate to morphemes, syllables and short character strings CH of from one to six characters, for example, that are encountered frequently and anywhere in the words of the language Lq and that in particular characterize the language Lq relative to the other languages L1 to L(q−1) and L(q+1) to LQ. The directory PRq contains prefixes, including syllables and non-morphological leading character strings, i.e. pseudo-prefixes, encountered frequently in the words of the language Lq. The directory SUq contains suffixes, including syllables and non-morphological terminations, i.e. pseudo-suffixes, encountered frequently in the words of the language Lq. The directory INq contains infixes, including syllables and non-morphological character strings, i.e. pseudo-infixes, encountered frequently in words in the language Lq.

For example, for the French language, the foregoing three directories PRq, SUq and INq contain the following characteristic morphemes and other character strings:
PRq=de-, re-, n'-, 1'-, qu'-, d'-;
SUq=-ais, -aient, -ent, -ée, -ées, -er
INq=-ou-, -oi-.

Each character string CH stored in one of the directories PRq, SUq and INq in the database 2 is associated with a respective coefficient CCH that depends on a coefficient PO and optionally on two coefficients FR and LON.

The coefficient PO depends on the position of the character string CH, which can be anywhere in a word of the language Lq, i.e. it depends on whether the character string CH constitutes a prefix or pseudo-prefix, a suffix or pseudo-suffix, or an infix or pseudo-infix. For French, for example, the coefficient PO is highest and equal to 1.4 for the suffix directory SUq, intermediate and equal to 1.3 for the prefix directory PRq, and lowest and equal to 0.8 for the infix directory INq.

The coefficient FR depends on, for example is proportional to, the frequency of the character string CH in the language Lq. For example, the coefficient FR is the average of occurrences of the character string CH in a relatively long text of more than approximately 1000 words in the particular language Lq. In French, for example, the termination "-es" is much more frequent and characteristic of the language than the termination "-ions". Consequently, the coefficient FR for the termination "-es" is higher than the coefficient FR for the less frequent termination "-ions". For the German language, the coefficient FR is much lower for each of the foregoing two terminations.

The coefficient LON depends on, for example is proportional to, the length of the character string CH. For example, for a word of ten characters, the coefficient LON is equal to 1.3 or 1.5 when the character string CH contains three or five characters.

The coefficient CCH is typically of the following form:

$$CCH=PO(FR+LON).$$

The fourth directory ATq in the database 3 concerns a typical characters and character strings that do not belong to the language Lq and are very rarely used therein.

For the French language, for example, the directory ATq is made up of a set of a typical or improbable pseudo-prefixes such as "kr, ge", a set of a typical or improbable pseudo-infixes such as "ä, ö, ñ, uu, kk", a set of a typical or improbable pseudo-suffixes such as "-ed", and a set of a typical or improbable words.

Each a typical character string in the database 3, also designated ATq, is associated with a respective coefficient CAT that increases as the probability of the a typical character string in the language Lq decreases.

The fifth directory MFq in the database 4 contains the most frequent words of the language Lq.

For the French language, for example, the directory MFq contains the following words: "de, le, la, les, y, à, il, ou, et" (of, the, therein, at/to, he/it, or, and).

Each frequent word, also designated MFq, is associated with a coefficient CMF representative of, for example proportional to, the frequency in the language Lq and possibly to the length of the frequent word MFq. For example, the coefficient CMF is the average of occurrences of the frequent word MFq in a relatively long text of more than approximately one thousand words in the determined language Lq.

The language identifier device DI also comprises a word comparator 5, a word analyzer 6, two character string comparators 7 and 8, a coefficient accumulator 9 and a score comparator 10. The logic modules 5 to 9 are used for each of the languages L1 to LQ. For a determined language Lq the logic modules 5 to 9 have the following functions.

The word comparator 5 compares each of the words extracted from the text TX by the extractor 1 to the frequent words MFq contained in the database 4 relative to the determined language Lq. The analyzer 6 analyzes each extracted word MT to construct all of the character strings CH included in the extracted word MT and having lengths lying between one character and the number of characters in the extracted word. Each of the character strings CH constructed by the analyzer 6 is fed to the comparators 7 and 8 in order to compare them to the first character strings PRq, SUq and INq contained in the database 2 for the determined language Lq and to the second character strings ATq included in the database 3 for the determined language Lq, respectively.

In the event of identity of the words or character strings in the comparator 5, or 7, 8, the latter authorizes reading of the respective coefficient CMF, or CCH, CAT in the databases 2, 3, 4 via read enabling AND gates 51, 71, 81 to feed the read coefficient to the coefficient accumulator 9. The coefficients CMF and CCH are added to a score Sq relating to the determined language Lq and initially set to zero, and an a typical character string coefficient CAT is subtracted from the language score Sq.

The score comparator 10 finally compares all of the language scores S1 to Sq that have been determined and stored by the accumulator 9 in order to determine the highest score which identifies the language of the text TX.

Figure 2:
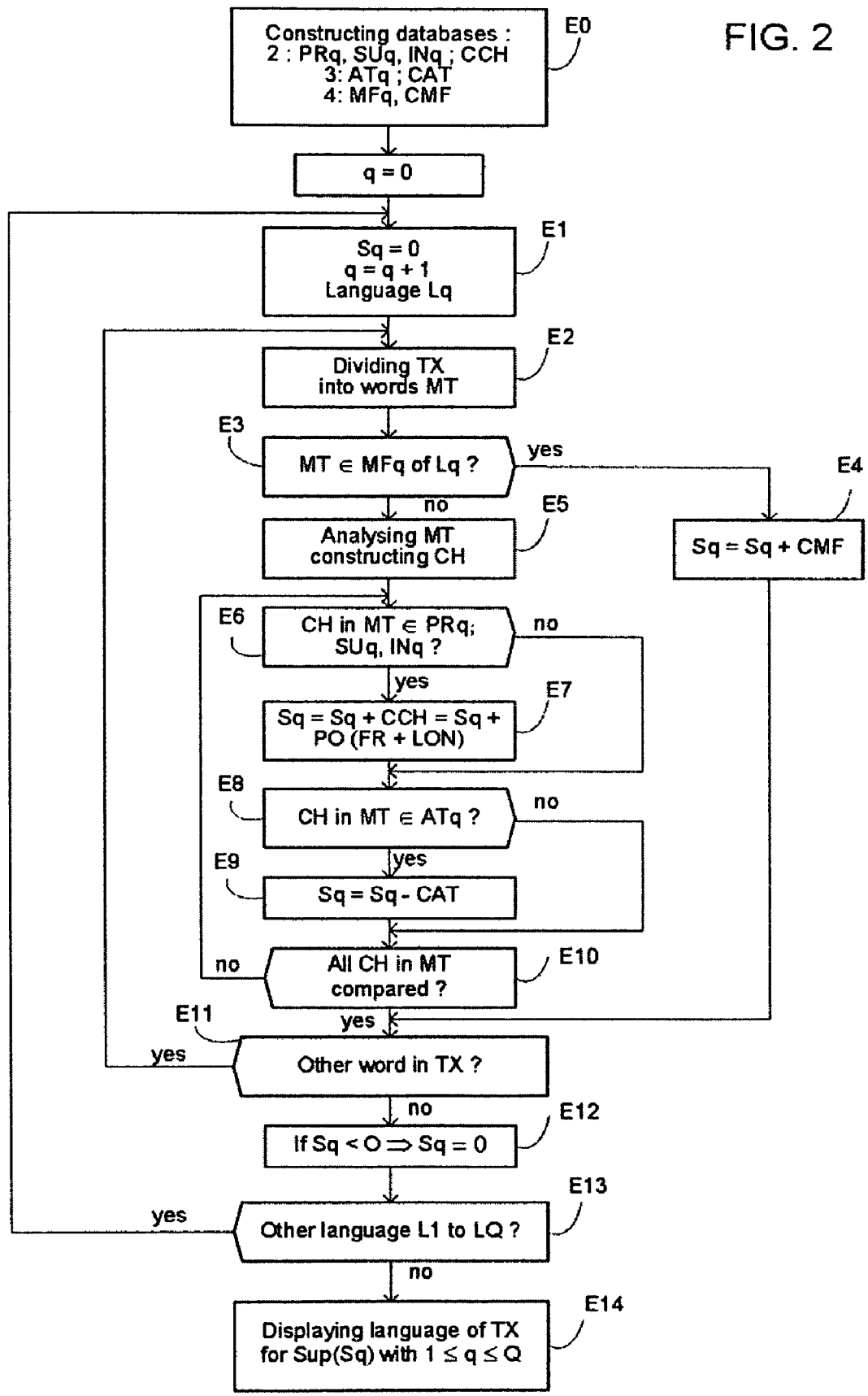
FIG. 2 is an automatic language identification algorithm according to the invention.

Referring now to FIG. 2, prior to automatic identification of the language of the text TX entered into or transmitted to the language identification device DI according to the invention, the five directories PRq, SUq, INq, ATq and MFq are constructed in the databases (DBMS) 2, 3 and 4 for each determined language Lq that the language identifier device DI is capable of identifying, where 1<q<Q, in an initial step E0. These directories are the result of a morphological analysis of the language Lq.

The identification of the language of the text TX made up of words MT or of a single word MT comprises the main steps E1 to E14 shown in FIG. 2.

Setting a language index q to 0, an identification is looked for relative to a first language, and more generally to a determined language Lq, in the first step E1. A score variable Sq is set to 0 and the language index q is increased by 1. Using the spaces between words, the extractor 1 divides the text TX to be processed up into extracted words MT, in the step E2.

The subsequent steps E3 to E11 are executed for each word MT extracted from the text TX.

In the step E3, the word comparator 5 interrogates the frequent word directory MFq of the language Lq to find out if it contains the word MT. If the word MT is in the directory MFq, the word comparator 5 authorizes reading of the coefficient CMF associated with the word MT via the gate 51 in order for the accumulator 9 to increases the score Sq of the read coefficient CMF, in the step E4. The more frequent the word MT in the language Lq, and where applicable the longer the word, the higher the coefficient CMF. The identification method then proceeds to the step E11.

If in the step E3 the comparator 5 does not consider the word MT to be a frequent word of the language Lq, the comparator 5 activates the word analyzer 6. The analyzer 6 analyzes the extracted word MT to construct and store either character strings CH included in the extracted word MT, as previously defined, in the directories included in the databases 2 and 3, or all the character strings CH included in the extracted word MT and having lengths lying between one character and the number of characters in the extracted word, in the step E5. In the latter variant, the character strings CH contained in the extracted word MT and found in the directories PRq, SUq and INq may partially overlap, in contrast to the n-grams of the approach disclosed in U.S. Pat. No. 6,292,772 B1 already commented on. For example, if the processed word MT is the French word "aiment", the character strings "ment" and "ent" placed in the pseudo-suffix directory SUq overlap in the processed word. To cite another example, the infix "oi" and the pseudo-suffix "is" of the processed word "vois" overlap.

The analyzer 6 then feeds the character strings CH constructed for the extracted word MT successively to the character string comparators 7 and 8.

The comparator 7 looks in the directories PRq, SUq and INq of the database 2 for the first character strings CH which are contained in the word MT, in the step E6. For each character string CH in the extracted word MT belonging to one of the directories PRq, SUq and INq, the character string comparator 7 authorizes reading of the coefficient CCH=PO(FR+LON) associated with the character string CH via the gate 71 in order for the accumulator 9 to increase the score Sq of the read coefficient CCH, in the step E7. The coefficients PO, FR and LON respectively depend on the position of the character string CH in the extracted word MT, on the frequency of the character string CH in the determined language Lq, and on the length of the character string CH.

Whether the character string CH in the extracted word MT has been found in the directories PRq, SUq and INq or not, and in parallel with the steps E6 and E7, the character string comparator 8 looks in the directory ATq of the database 3 for the character strings CH which are contained in the word MT, in the step E8. For each character string CH in the extracted word MT belonging to the directory ATq, the comparator 8 authorizes the reading of the coefficient CAT associated with the character string CH via the gate 81 in order for the accumulator 9 to reduce the score Sq of the read coefficient CAT, in the step E9.

In the step E10, the steps E6 to E9 are repeated for each of the character strings CH contained in the extracted word MT. The score Sq for the determined language Lq is thus increased by the sum of the coefficients CCH and reduced by the sum of the coefficients CAT relating to the character strings CH included in the extracted word MT and respectively found in the directories of the databases 2 and 3, or increased by the coefficient CMF if the extracted word MT has been found in the directory MFq of the database 4, after the step E10.

In the step E11, if the processed text TX contains other words, the steps E2 to E10 are executed for each of the words extracted from the text TX. When all of the text TX has been processed, if the score Sq for the language Lq is negative, because of the application of the step E9, the score Sq can be set to 0 in the step E12. The score Sq for the language Lq is stored in the device DI which, in the step E13, verifies that the score of another language must be determined by executing the steps E1 to E12.

When the scores S1 to SQ of all the languages L1 to LQ have been determined for the processed text TX, the score comparator 10 compares the Q scores in order to determine the highest score Sup(Sq), which identifies the language of the text TX, in the step E14. For example, an identifier of the language of the text identified in this way is then transmitted by the device DI to a syntactical and semantic analyzer to translate the text TX into the mother tongue of a user, or to convert the text to speech, or to use the identifier of the language to index the text as a function of its difficulty to understand or to generate gaps to construct from it an exercise with missing words for learning the identified language.

If necessary, in the step E14, the device DI displays to the user the scores for all the languages L1 to Lq sorted in decreasing order. There is no a priori limit on the number Q of languages.

If the text is made up of one or more words belonging to two different languages for which the respective coefficients for the two languages are identical, the scores for the two languages are identical, and not different as in the prior art.

Language identification in accordance with the invention is particularly effective compared to the prior art technique if the text is relatively short. However, language identification in accordance with the invention can be combined with language identification using a prior art statistical approach, by applying language identification in accordance with the invention if the text contains a number of characters or words below a predetermined threshold, and using the prior art statistical approach to identification if the number of characters or words in the processed text TX is greater than the predetermined threshold.

What is claimed is:

1. A device for automatically identifying the language of a digital text, comprising:

means for prestoring first character strings, including prefixes, suffixes and infixes, of different lengths from words of a plurality of predetermined languages, that occur frequently anywhere respectively in said words of said plurality of predetermined languages, means for prestoring second character strings of different lengths, that are A typical anywhere respectively in said words of said predetermined languages, means for analyzing words extracted from said digital text, thereby constructing for each extracted word all the character strings contained in said extracted word, including all the prefixes, suffixes and infixes in said extracted word, with overlap and different lengths lying between one character and the number of characters in said extracted word, means for comparing each of said character strings contained in each said extracted word to said first prestored character strings and second prestored character strings of said predetermined languages, means for calculating scores respectively associated with said predetermined languages, a score associated with one determined language being calculated by adding to said score a first coefficient whenever a prestored first character string of said one determined language is found in said extracted word, said first coefficient depending on the position of said found prestored first character string of said one determined language in said extracted word, and, by subtracting from said score a second coefficient whenever a prestored second character string of said one determined language is found in said extracted word, said second coefficient increasing as the probability of said found prestored second character string in said one determined language decreases, and means for comparing said scores for said text associated with said predetermined languages in order to determine the highest of said scores, which identities the language of said text.

2. The device claimed in claim 1, wherein said first coefficient of a first character string in said extracted word depends on the frequency of said character string in said determined language.

3. The device claimed in claim 1, wherein said first coefficient of a first character string in said extracted word depends on the length of said character string.

4. The device claimed in claim 1, wherein said first coefficient of a first character string in said extracted word is equal to:

PO (FR+LON), where

PO is a coefficient depending on the position of said first character string in said extracted word, FR is a coefficient depending on the frequency of said first character string in a determined language, and LON is a coefficient depending on the length of said first character string.

5. The device claimed in claim 1, comprising comparator means for comparing each of said extracted words from said text with frequent words in said determined language and initially listed in storage means so that whenever a frequent word is found in said text, said score for said determined language is increased only by a coefficient depending on the frequency of said extracted word in said determined language.

6. The device claimed in claim 1, comprising comparator means for comparing each of said extracted words from said text with frequent words in said determined language and initially listed in storage means so that whenever a frequent word is found in said text, said score for said determined language is increased only by a coefficient depending on the length of said frequent word.

7. A method of automatically identifying the language of a digital text, the method being performed with a computer arrangement including a storing arrangement and a processor arrangement, the storing arrangement prestoring (a) first character strings, including prefixes, suffixes and infixes, of different lengths from words of a plurality of predetermined languages, that occur frequently anywhere respectively in said words of said plurality of predetermined languages, and (b) second character strings of different lengths, that are a typical anywhere respectively in said words of said predetermined languages, the method comprising:

in the processor arrangement: (a) analyzing words extracted from said digital text, thereby constructing for each extracted word all the character strings contained in said extracted word, including all the prefixes, suffixes and infixes in said extracted word, with overlap and different lengths lying between one character and the number of characters in said extracted word, (b) comparing each of said character strings contained in each said extracted word with said first prestored character strings and second prestored character strings of said predetermined languages, (c) calculating scores respectively associated with said predetermined languages, the calculation of a score associated with one determined language being performed (i) by adding to said score a first coefficient whenever a prestored first character string of said one determined language is found in said extracted word, said first coefficient depending on the position of said found prestored first character string of said one determined language in said extracted word, and (ii) subtracting from said score a second coefficient whenever a prestored second character string of said one determined language is found in said extracted word, said second coefficient thereby increasing as the probability of said found prestored second character string in said one determined language decreases, and (d) comparing said scores for said text associated with said predetermined languages in order to determine the highest of said scores, the highest of the scores identifying the language of said text.

8. A device for automatically identifying the language of a digital text, comprising:

means for prestoring first character strings that occur frequently anywhere respectively in words of a plurality of predetermined languages and characterize said predetermined languages, means for prestoring second character strings that are a typical anywhere respectively in words of said predetermined languages means for analyzing words extracted from said digital text, thereby constructing for each extracted word all character strings contained in said extracted word and having lengths lying between one character and the number of characters in said extracted word, means for comparing character strings contained in extracted words to prestored character strings in order to determine scores associated with said predetermined languages, means for individually Comparing each of all character strings contained in each said extracted word to said first prestored character strings and said second prestored character strings of each determined language so that whenever a prestored first character string is found in said extracted word, a score associated with said each determined language is increased by a first coefficient depending on the position of said first character string found in said extracted word, and, whenever a prestored second character string is found in said extracted word, said score is decreased by a respective second coefficient that is associated with said found second character string, said respective second coefficient increasing as the probability of said found second character string in said each determined language decreases, and means for comparing said scores for said text associated with said predetermined languages in order to determine the highest of said scores, which identifies the language of said text, wherein said first coefficient of a first character string in said extracted word is equal to:

PO (FR+LON), where

PO is a coefficient depending on the position of said first character string in said extracted word, FR is a coefficient depending on the frequency of said first character string in a determined language, and LON is a coefficient depending on the length of said first character string.

9. The method of claim 7, wherein said first coefficient of a first character string in said extracted word is equal to:

PO (FR+LON), where

PO is a coefficient depending on the position of said first character string in said extracted word, FR Is a coefficient depending on the frequency of said first character string in a determined language, and LON is a coefficient depending on the length of said first character string.

* * * * *